(12) United States Patent  
Oshita (10) Patent No.: US 9,063,598 B2  
(45) Date of Patent: Jun. 23, 2015

(54) INPUT DEVICE INCLUDING MOVABLE TOUCH PAD

(71) Applicant: ALPS ELECTRIC CO., LTD., Tokyo (JP)

(72) Inventor: Kazuhito Oshita, Miyagi-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 131 days.

(21) Appl. No.: 13/772,132

(22) Filed: Feb. 20, 2013

(65) Prior Publication Data

US 2013/0229369 A1  Sep. 5, 2013

(30) Foreign Application Priority Data

Mar. 2, 2012  (JP) ................. 2012-046171

(51) Int. Cl.
G06F 3/041 (2006.01)
G06F 3/038 (2013.01)
G06F 3/0354 (2013.01)

(52) U.S. Cl.
CPC ............... G06F 3/041 (2013.01); G06F 3/038 (2013.01); G06F 3/03547 (2013.01)

(58) Field of Classification Search
CPC ....... G06F 3/045; G06F 3/0488; G06F 3/044; G06F 3/041; G06F 3/03547; G06F 3/0416; G06F 3/038; G06F 3/0414; G06F 3/0234; G06F 2203/04105

USPC ............... 345/173–174, 156, 169, 108; 178/18.01, 18.03, 18.05–18.07, 19.01, 178/19.03, 19.04; 715/702, 708

See application file for complete search history.

(56) References Cited

U.S. PATENT DOCUMENTS

| 5,327,161 A * | 7/1994 | Logan et al. .................. 345/157 |
| 5,764,218 A * | 6/1998 | Della Bona et al. .......... 345/157 |
| 5,907,327 A * | 5/1999 | Ogura et al. .................. 715/764 |
| 7,576,732 B2 * | 8/2009 | Lii ................................ 345/173 |
| 2007/0273671 A1 * | 11/2007 | Zadesky et al. ............... 345/173 |
| 2008/0266143 A1 | 10/2008 | Ohshita et al. |
| 2010/0103127 A1 * | 4/2010 | Park et al. .................... 345/173 |
| 2011/0157087 A1 * | 6/2011 | Kanehira et al. .............. 345/174 |
| 2011/0216005 A1 * | 9/2011 | Lin et al. ...................... 345/168 |

FOREIGN PATENT DOCUMENTS

JP  2008-117212  5/2008

* cited by examiner

*Primary Examiner* — Lun-Yi Lao  
*Assistant Examiner* — Elliott Deaderick  
(74) *Attorney, Agent, or Firm* — Beyer Law Group LLP (57) ABSTRACT

An input device includes a touch pad which is rotatably supported and has an upper surface as an input operation surface, a switch element located on a lower side of the touch pad, and a control unit configured to perform a continued-ON state control during an operation of an operation body (finger, etc.) moving on the input operation surface and pressing the input operation surface downwardly to cause the switch element to be in an ON state, the continued-ON state control maintaining the ON state even if the ON state of the switch element is released while the operation of the operation body continues on or in a vicinity of the input operation surface.

8 Claims, 7 Drawing Sheets

INPUT DEVICE INCLUDING MOVABLE TOUCH PAD

CLAIM OF PRIORITY

This application claims benefit of Japanese Patent Application No. 2012-046171 filed on Mar. 2, 2012, which is hereby incorporated by reference.

BACKGROUND OF THE INVENTION

1. Field of the Invention

The present invention relates to an input device which includes a rotatably supported touch pad and a switch element on a lower side of the touch pad and allows an input operation to be performed while an input operation surface of the touch pad is pressed to cause the switch element to be in an ON state.

2. Description of the Related Art

Figure 9:
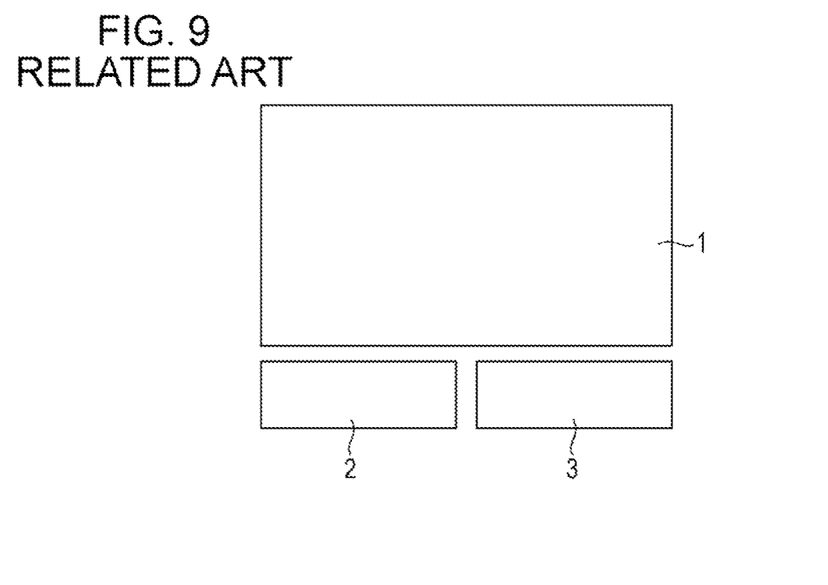
FIG. 9 is a plan view of an existing input device.

FIG. 9 shows a plan view of an existing input device. In the input device in FIG. 9, a touch pad 1 and switch portions 2 and 3 adjacent to the touch pad 1 are provided. In the input device in FIG. 9, the touch pad 1 and the switch portions 2 and 3 are provided in two-dimensionally different regions.

For example, in the case where a drag operation is performed on an icon on a display screen (not shown), while the switch portion 2 shown in FIG. 9 is pressed with a finger of one hand, the touch pad 1 is operated with a finger of the other hand. By so doing, a drag operation is possible.

Figure 10A:
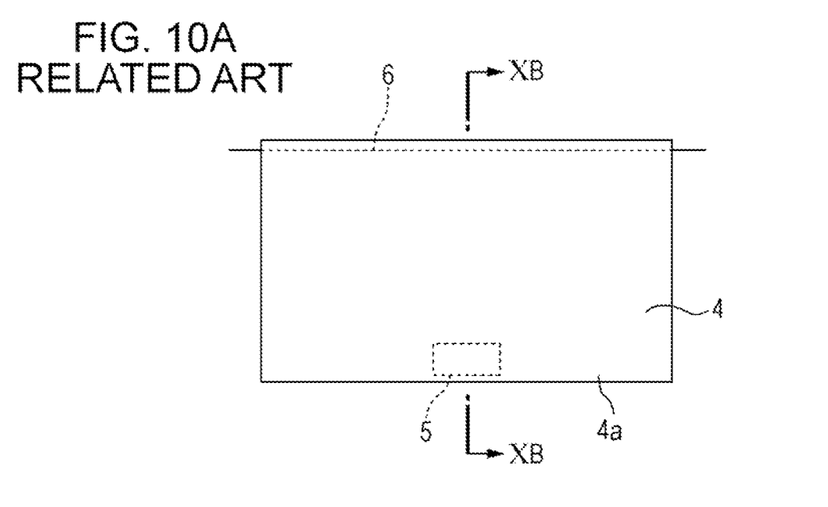
FIGS. 10A and 10B are plan views of an existing input device different from that in FIG. 9.
Figure 10B:
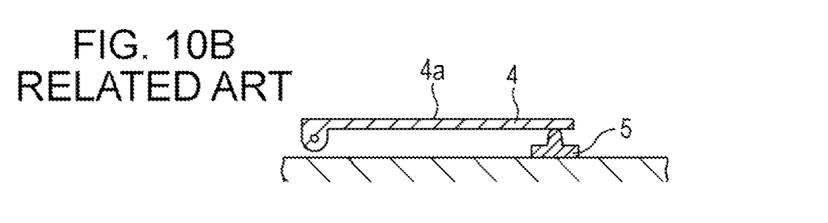

Meanwhile, in Japanese Unexamined Patent Application Publication No. 2008-117212, a touch pad is movable, and a switch is provided below the touch pad. The structure of the input device disclosed in Japanese Unexamined Patent Application Publication No. 2008-117212 is schematically shown in FIGS. 10A and 10B. FIG. 10A is a plan view, and FIG. 10B is a longitudinal cross-sectional view taken along the line XB-XB in FIG. 10A as seen from an arrow direction. Reference character 4 denotes a touch pad, reference character 5 denotes a switch element located below the touch pad 4, and reference character 6 denotes a hinge portion which rotatably supports the touch pad 4. In the existing input device shown in FIGS. 10A and 10B, a switch input is possible by pressing the touch pad 4.

In the structure of the input device shown in FIGS. 10A and 10B, a drag operation is possible by performing an input operation while pressing the touch pad 4. In the input device shown in FIGS. 10A and 10B, a drag operation is possible with only a finger of one hand, and thus the operability can be improved.

In a configuration with a movable touch pad as in the above input device, during an operation of a finger being moved on an input operation surface 4a while the switch element 5 is caused to be in an ON state, if the pressing force is unexpectedly decreased, the ON state of the switch element 5 may be released and a drag state may be unintentionally released in its middle.

In addition, even though a pressing force applied to the touch pad 4 is kept constant, for example, when an input operation is performed near the hinge portion 6 of the touch pad 4, rotation of the touch pad 4 in the height direction tends to be small as compared to that with an operation at a location away from the hinge portion 6. Thus, the pressing force applied to the switch element 5 is decreased, and the ON state of the switch element 5 is likely to be released.

SUMMARY OF THE INVENTION

The present invention is intended to solve the above problems of the related art, and particularly provides an input device which includes a movable touch pad and which, even when an ON state of a switch element is unintentionally released during an input operation performed with a switch element pressed, allows the ON state to continue.

The present invention provides an input device including: a movable touch pad rotatably supported and having an upper surface as an input operation surface; a switch element located on a lower side of the touch pad; and a control unit configured to be able to perform control such that during an operation of an operation body being moved on the input operation surface while the input operation surface is pressed downwardly by the operation body to cause the switch element to be in an ON state, the ON state is continued even if the ON state is released in a state where the operation of the operation body on the input operation surface is kept. Here, the "state where the operation of the operation body on the input operation surface is kept" is a state where the operation body is caused to touch or come close to (not touch) the input operation surface, and refers to a state where an operation position of the operation body can be detected.

According to the present invention, even if an ON state of the switch element is unintentionally released during an input operation of the operation body, the ON state can be continued and, for example, a drag operation can be continued on a display body displayed on a display apparatus.

In the present invention, continuation control of the ON state is preferably executed under a condition that an operation coordinate (X,Y) of the operation body is within a specific region defined within the input operation surface. As described above, in the present invention, since the continuation control of the ON state is limitedly executed for the specific region within the input operation surface, the operability differentiated from a non-specific region can be ensured, and smooth operability and operability having high flexibility can be ensured.

In addition, in the present invention, continuation control of the ON state is preferably executed under a condition that an operation start position of the operation body is located in a non-specific region outside a specific region defined within the input operation surface and the ON state is released within the specific region. The "operation start position" refers to an operation position of the operation body when it is determined in a routine of the continuation control of the ON state of the switch element, for example, whether or not the operation body such as a finger initially touches or comes close to the input operation surface and an operation signal of the operation body is obtained. Since the continuation control of the ON state is performed when an operation shifts from a non-specific region into the specific region as described above, smooth operability and operability having high flexibility can be ensured.

In addition, in the present invention, the specific region is preferably set near a hinge portion for rotatably supporting the touch pad. When an input operation is performed near the hinge, an ON state of the switch element is likely to be unintentionally released. Thus, by setting the specific region near the hinge portion, the continuation control of the ON state can be effectively performed.

In addition, in the present invention, continuation control of the ON state may be executed under a condition that a movement distance (dist) of the operation body on the input operation surface is larger than a threshold L. In this case, the threshold L may be able to be changed according to a moving direction of the operation body.

In addition, in the present invention, continuation control of the ON state may be released by a predetermined condition. The predetermined condition preferably can include at least any of a continuation time of the ON state, a number of times of data indicating that the operation body does not touch or come close to the input operation surface, and a number of times of polling.

DESCRIPTION OF THE PREFERRED EMBODIMENTS

Figure 1:
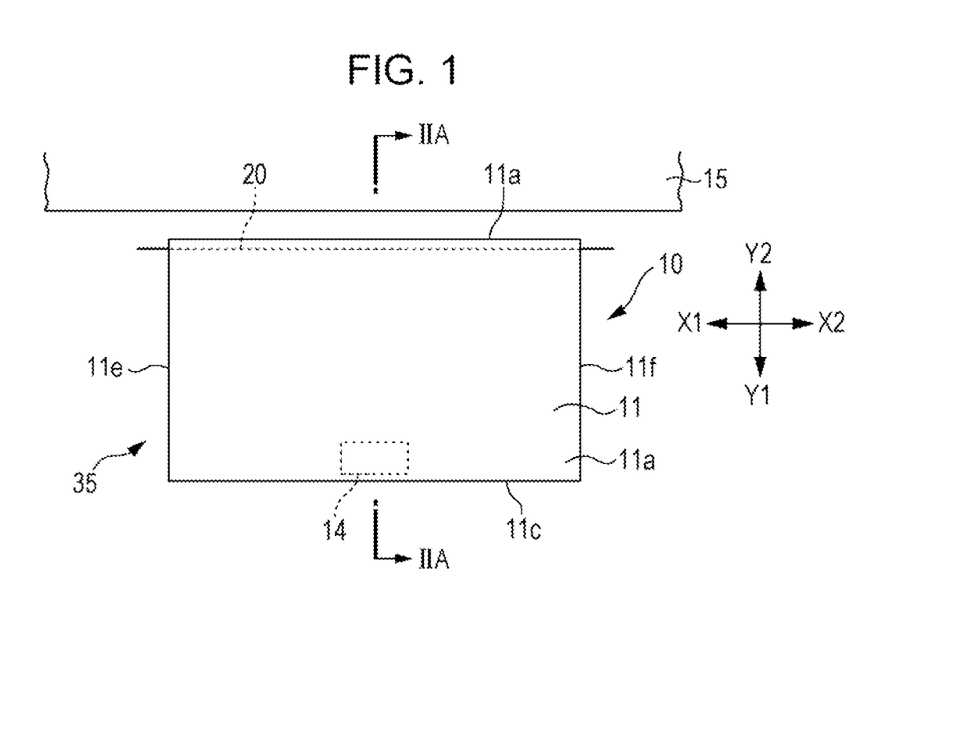
FIG. 1 is a plan view of an input device according to an embodiment.
Figure 2A:
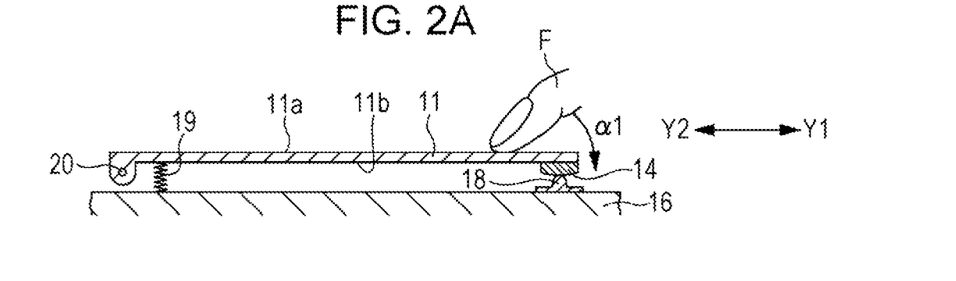
FIG. 2A is an enlarged longitudinal cross-sectional view of the input device shown in FIG. 1, taken along the line IIA-IIA as seen from an arrow direction.
Figure 2B:
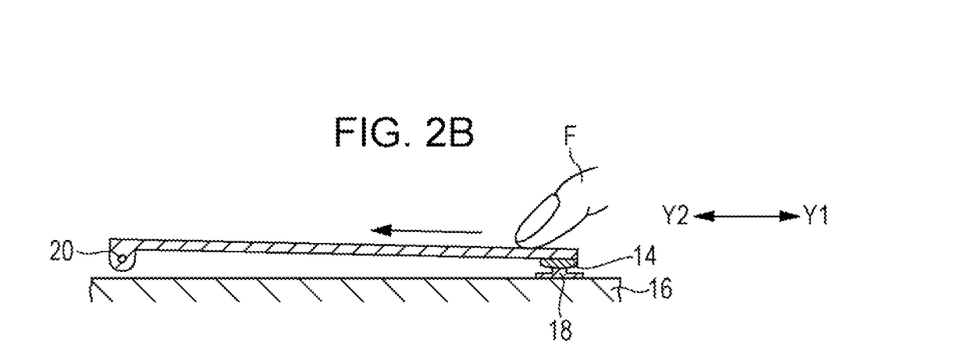
FIG. 2B is an enlarged longitudinal cross-sectional view of the input device, showing a situation where an operation of a finger (operation body) being moved on an input operation surface is performed while a switch element is caused to be in an ON state.

FIG. 1 is a plan view of an input device according to an embodiment, FIG. 2A is an enlarged longitudinal cross-sectional view of the input device shown in FIG. 1, taken along the line IIA-IIA as seen from an arrow direction, and FIG. 2B is an enlarged longitudinal cross-sectional view of the input device, showing a situation where an operation of a finger (an operation body) being moved on an input operation surface is performed while a switch element is caused to be in an ON state.

The input device 10 shown in FIGS. 1 to 2B includes a touch pad 11 and a switch element 14 located on a lower surface 11$b$ side of the touch pad 11.

As shown in FIGS. 1 to 2B, an upper surface of the touch pad 11 is an input operation surface 11$a$. The touch pad 11 is, for example, an electrostatic capacitive type. When an input operation is performed on the input operation surface 11$a$ with a finger F (a pointing body), it is possible to detect the operated position by change in capacitance. The input device 10 shown in the embodiment is provided, for example, in a palm rest 35 on the near side (Y1) of a keyboard device 15 provided in a notebook computer.

The touch pad 11 shown in FIGS. 1 to 2B is formed in a substantially rectangular shape having a front end portion 11$c$ on a Y1 side, a back end portion 11$d$ on a Y2 side, a left end portion 11$e$ on an X1 side, and a right end portion 11$f$ on an X2 side when a Y1-Y2 direction is defined as a front-back direction and an X1-X2 direction is defined as a left-right direction. It is noted that the shape of the touch pad 11 is not particularly limited.

As shown in FIGS. 2A and 2B, a support plate 16 is provided below the touch pad 11. The support plate 16 may be, for example, a substrate on which a plurality of key switches of the keyboard device 15 are arranged, or may be provided independently of the substrate.

As shown in FIGS. 1 to 2B, the switch element 14 is fixed and supported to the lower surface 11$b$ of the touch pad 11. In addition, a switch receiving portion 18 is located on the support plate 16 side and at a position facing the switch element 14. The configuration of the switch receiving portion 18 is not particularly limited, but the switch receiving portion 18 is composed of a plate-shaped portion having a predetermined thickness and a plunger which is located on the plate-shaped portion and has a projection extending toward the switch element 14. It is noted that in the embodiment, the configuration of a switch device having the switch element 14 is not particularly limited.

As shown in FIGS. 1 to 2B, the switch element 14 is located on the lower surface 11$b$ on the front side (Y1) of the touch pad 11.

As shown in FIGS. 1 to 2B, a hinge portion 20 is provided on the back side (Y2) of the touch pad 11. The hinge portion 20 is provided so as to project in the left-right direction (X1-X2).

As shown in FIG. 2A, when the finger F is brought into contact with the input operation surface 11$a$ to press the touch pad 11 downwardly, the touch pad 11 rotates about the hinge portion 20 downwardly in an arrow α1 direction. By so doing, as shown in FIG. 2B, the switch element 14 is pressed to cause the switch element 14 to be in an ON state.

It is noted that when the finger F is separated from the touch pad 11, the touch pad 11 rotates about the hinge portion 20 upwardly by the returning force of the switch element 14 and returns to the original position, and the switch input is released (an OFF state is provided).

In addition, as shown in FIG. 2A, a spring 19 can be provided between the touch pad 11 and the support plate 16, and the touch pad 11 can return to the original position by the returning force of the spring 19.

Figure 3A:
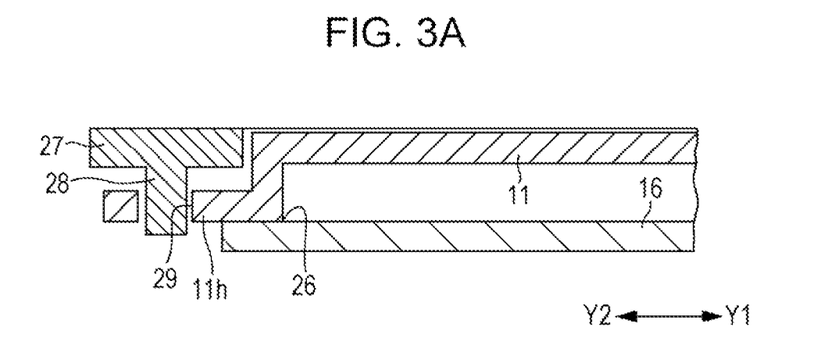
FIG. 3A is an enlarged longitudinal cross-sectional view showing the configuration of a hinge portion different from that in FIGS. 2A and 2B.

Alternatively, a hinge structure shown in drawings may be provided. In FIG. 3A, a back end portion 11$h$ on the Y2 side of the touch pad 11 is bent downwardly, and is in contact with a surface of the support plate 16 to constitute a hinge portion 26. Reference character 27 denotes a housing, and a positioning projection 28 formed so as to extend downwardly from the housing 27 is inserted into a positioning hole 29 on the touch pad 11 side.

Figure 3B:
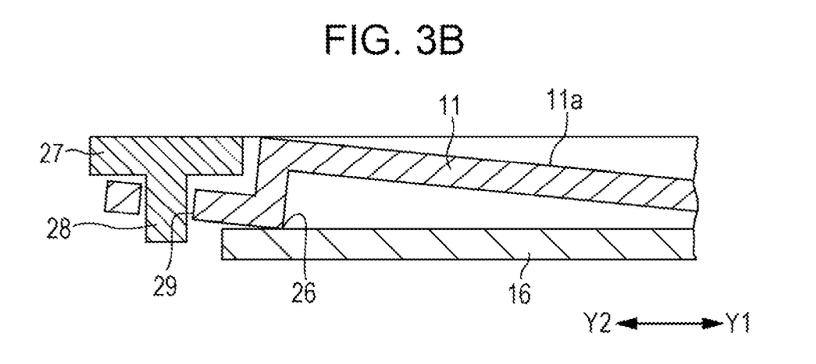
FIG. 3B a partially-enlarged longitudinal cross-sectional view showing a state where a touch pad is pressed with a finger.

As shown in FIG. 3B, when the input operation surface 11$a$ of the touch pad 11 is pressed downwardly, the touch pad 11 rotates downwardly about the hinge portion 26.

Figure 4:
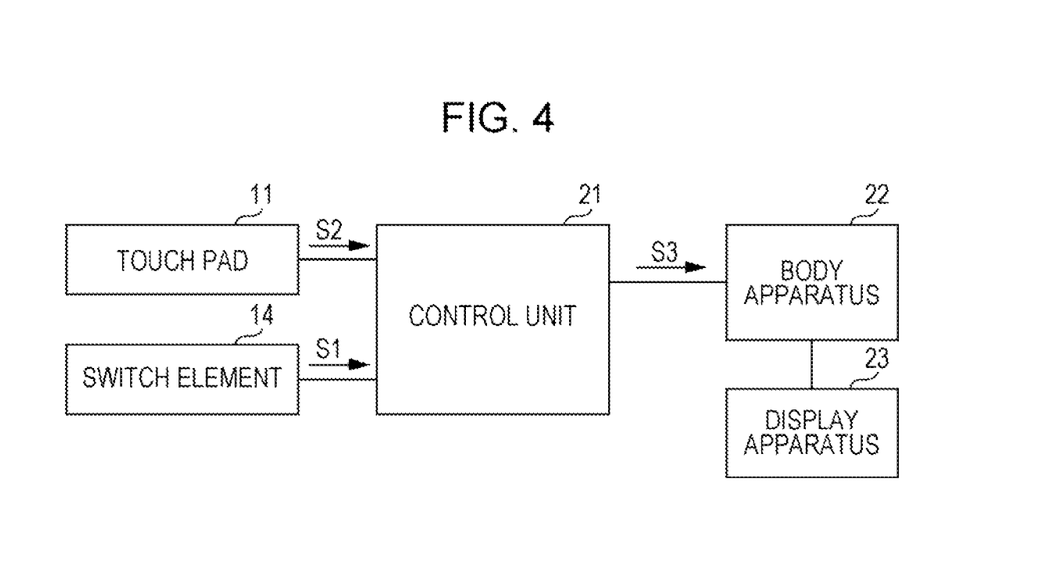
FIG. 4 is a block diagram of the input device according to the embodiment.

In the embodiment, when the switch element 14 is caused to be in an ON state, an ON signal S1 is transmitted to a control unit 21 as shown in FIG. 4. An operation position signal S2 of the finger F is transmitted from the touch pad 11 to the control unit 21. On the basis of these signals S1 and S2, an execution signal S3 for a display apparatus 23 is transmitted from the control unit 21 to an apparatus body 22. On the basis of the execution signal S3, the apparatus body 22 executes certain operations and functions for various display bodies displayed on the display screen of the display apparatus 23.

Figure 7:
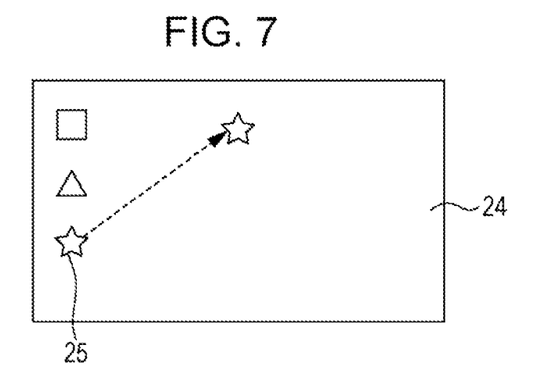
FIG. 7 is a front view showing a display screen of a display apparatus.

For example, as shown in FIG. 2B, when the finger F is moved in an arrow direction while the switch element 14 is caused to be in the ON state, it is possible to perform a drag operation on an icon 25 on a display screen 24 as shown in FIG. 7.

In the embodiment, in the control unit 21, even when, during an input operation as shown in FIG. 2B, the pressing force to the switch element 14 is unintentionally decreased and the ON state of the switch element 14 is released (an OFF state is provided), the ON state of the switch element 14 is enabled to continue as long as the finger F touches or comes close to the input operation surface 11a to keep the input operation.

Figure 6A:
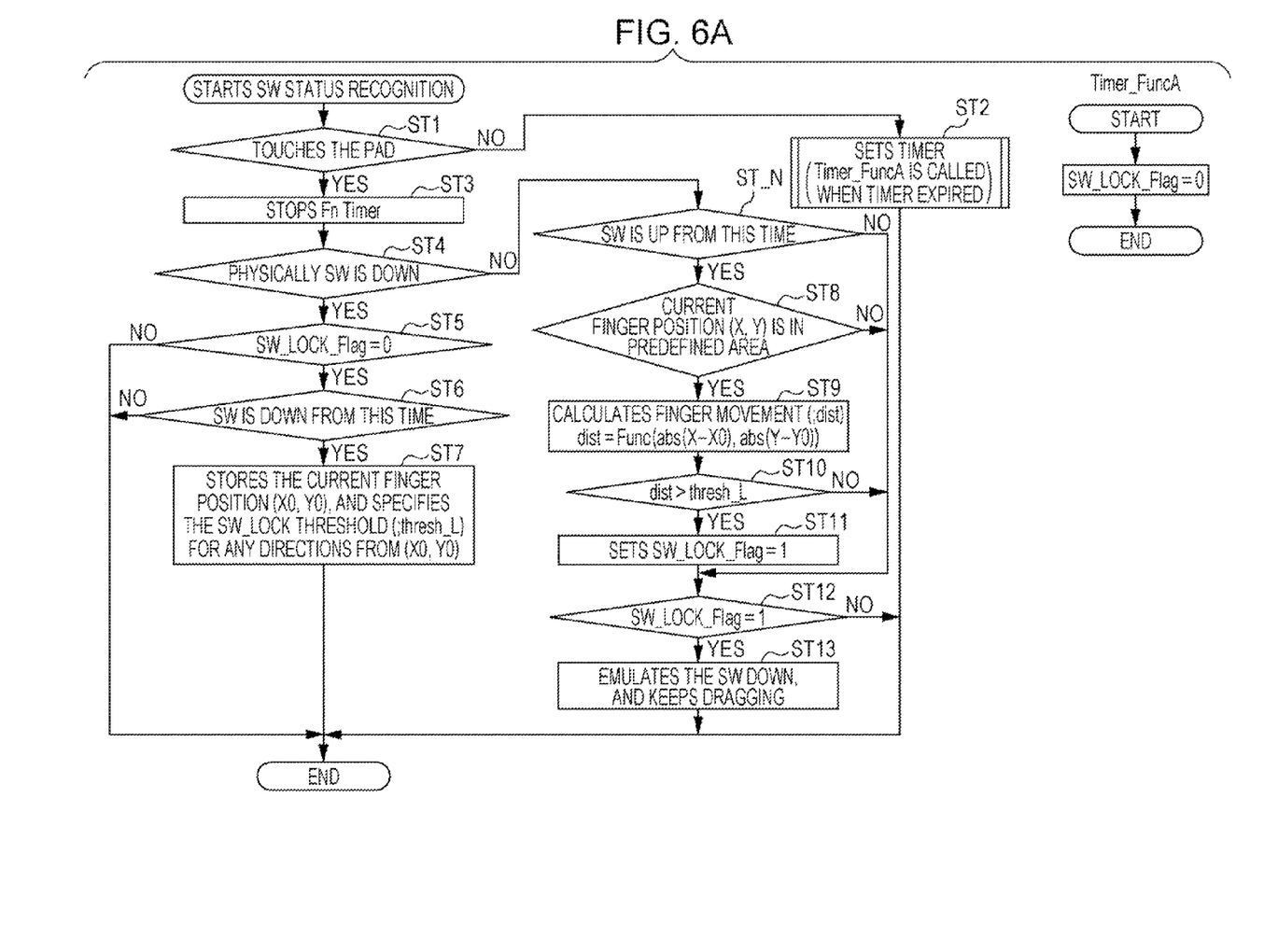
FIG. 6A is a flowchart regarding continuation control of an ON state of the switch element in the embodiment.

FIG. 6A is a control flow for continuing an ON state of the switch element 14. It is noted that in the embodiment, "continuation control of an ON state" means that as long as an operation body such as the finger F continues to perform an operation on the input operation surface 11a (as long as the operation body touches or comes close to the input operation surface 11a and a position signal is obtained), even when the ON state of the switch element 14 is released, the ON state is continued.

In step ST1 in FIG. 6A, it is determined whether or not the finger F touches the input operation surface 11a of the touch pad 11. This determination can be performed on the basis of presence/absence of the operation position signal S2 shown in FIG. 4. It is noted that if the touch pad 11 is in a state of being able to identify an operation position even when the finger F does not touch the input operation surface 11a and comes close to the input operation surface 11a as in a capacitance type or the like, the processing can be advanced to a control routine to continue an ON state of the switch element 14.

If the determination in step ST1 is "No", the processing proceeds to step ST2, where a timer (Timer FuncA: Fn Timer) is set (see the upper right of FIG. 6A). In step ST2, a "SW_LOCK_Flag" is set to "0".

It is noted that at a stage (a non-input state; an initial stage) prior to performing an input operation with the finger F, the "SW_LOCK_Flag" is set to "0" by step ST2, and thus a description will be given on the assumption that the "SW_LOCK_Flag" is set to "0" at this stage.

If the determination in step ST1 is "Yes", the processing proceeds to step ST3, where the timer (Fn Timer) shown in ST2 is stopped.

Next, in step ST4, it is determined whether or not the switch element 14 is pressed to be in an ON state. This determination can be performed on the basis of presence/absence of the ON signal S1 shown in FIG. 4. If it is determined that the switch element 14 is in an ON state, the processing subsequently proceeds to step ST5.

In step ST5, it is determined whether or not the "SW_LOCK_Flag" is "0". At this stage, the "SW_LOCK_Flag" is "0", and thus the processing subsequently proceeds to step ST6.

In step ST6, it is determined whether or not the ON state of the switch element 14 is started from this stage. Specifically, when the processing proceeds from step ST1 to step ST7 and returns again to the determination in step ST6 without returning to an non-input state (initial state), the determination in step ST6 has been performed at the last time, and thus the next step ST 7 is skipped. In this time, the determination in step ST6 is performed for the first time from the non-input state (initial state), and thus the processing proceeds to the next step ST7.

In step ST7, an operation start coordinate (X0,Y0) of the finger F is obtained. The operation start position may be the operation position signal obtained in step ST 1 where it is determined whether or not the finger F touches the touch pad 11, or if an operation position signal is obtained also in step ST4, the operation position signal in step ST4 can be used. It is noted that in the specification, a coordinate at an operation position after the finger F moves from the operation start position is referred to as an operation coordinate (X,Y).

Furthermore, in step ST7, the magnitude of a threshold L (L is a distance) for continuing (SW_LOCK) an ON state of the switch element 14 is defined depending on in which direction the finger F moves from the operation start coordinate (X0,Y0). The threshold L is a reference distance for determining whether or not to continue an ON state of the switch element 14.

Figure 5:
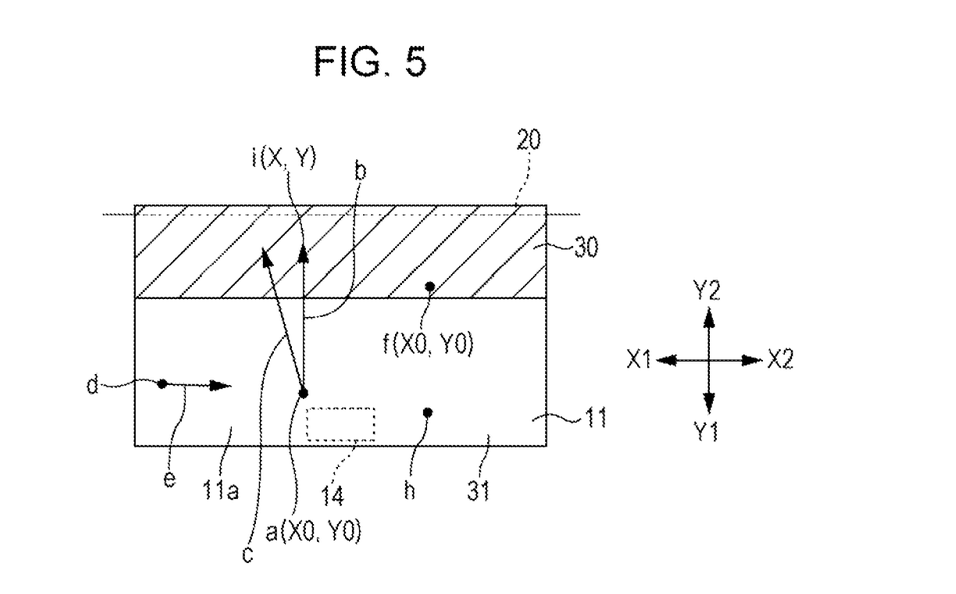
FIG. 5 is a plan view showing a specific region set on the input operation surface of the touch pad in the embodiment.

For example, as shown in FIG. 5, when the finger F moves from an operation start position a toward the hinge portion 20 in a direction (Y2) perpendicular to the hinge portion 20 (an arrow b) or in an oblique direction relative to the hinge portion 20 (an arrow c), or when the finger F moves from an operation start position d in a direction substantially parallel to the hinge portion 20 or in a direction away from the hinge portion 20 (an arrow e), the threshold L can be changed as appropriate. Here, the magnitude of the threshold L can be set such that a threshold L1 in the case of the movement direction of the arrow b<a threshold L2 in the case of the movement direction of the arrow c<a threshold L3 in the case of the movement direction of the arrow e.

The reason why the threshold L is set as described above is that the ON state of the switch element 14 is easy or difficult to release, depending on the movement direction of the finger F. For example, when the direction is close to a direction to approach the hinge portion 20, even if the touch pad 11 is pressed with the same pressing force, rotation of the touch pad 11 is reduced and the pressing force to the switch element 14 is decreased. Thus, when the movement direction of the finger F is the arrow b, the ON state of the switch element 14 is likely to be released at a time when the movement distance is short, as compared to the case where the movement direction is the arrow c or e. Therefore, when the movement direction of the finger F is the arrow b, it is desirable to make the threshold L1 the lowest as described above.

If the switch element 14 is pressed in step ST4 shown in FIG. 6A, an ON signal is outputted.

If it is determined in step ST4 shown in FIG. 6A that the switch element 14 is not pressed, the processing proceeds to step STN. In step STN, it is determined when a state where the switch element 14 is not pressed continues from. If it is determined that the state where the switch element 14 is not pressed is started from this time, the processing proceeds to step ST8.

In step ST8, it is determined whether or not the operation coordinate (X,Y) is within a specific region 30. In the embodiment shown in FIG. 5, the specific region 30 is indicated by diagonal lines. As shown in FIG. 5, the specific region 30 is a region on the back side (Y2) of the input operation surface 11a and is on the side where there is the hinge portion 20. In FIG. 5, the specific region 30 is defined with a predetermined width from the hinge portion 20 toward the front side (Y1), whereby the specific region 30 can be set near the hinge portion (including the position of the hinge portion 20). Meanwhile, the front side of the specific region 30 is a non-specific region 31.

For example, the operation start position a is initially within the non-specific region 31. When the operation position shifts from the inside of the non-specific region 31 to the inside of the specific region and the pressed state of the switch element 14 is released, for example, at an operation position i, in step ST8, an operation coordinate (X,Y) at the operation position i is obtained and it is determined whether or not the operation coordinate (X,Y) is within the specific region 30. In FIG. 5, the operation coordinate (X,Y) is within the specific region 30, and thus the processing proceeds to the next step ST9. It is noted that in the case of an operation position h as shown in FIG. 5, the operation position h is located in the non-specific region 31 and thus the condition of step ST8 is not met. In this case, continuation control of an ON state of the switch element 14 is not performed.

Since the non-specific region 31 is located on a side away from the hinge portion 20, a pressing force can be sufficiently transmitted to the switch element 14. Therefore, when an operation is performed within the non-specific region 31, it is only necessary to perform normal control, namely, a drag operation as shown in FIG. 7 under the condition that the switch element 14 is caused to be in an ON state. Even when the ON state of the switch element 14 is released in the non-specific region 31, it is not determined in this case that the release is unintentional, and the drag operation is released as normal.

In step ST9, a movement distance (dist) from the operation start position of the finger F is calculated. As shown in FIG. 5, when the finger F moves from the operation start position a to the operation position i, the operation coordinate (X,Y) at the operation position i is obtained and a movement distance (X-X0,Y-Y0) is calculated by a calculation section within the control unit 21.

Subsequently, in step ST10, it is determined whether or not the movement distance (dist) calculated in step ST9 is larger than the threshold L. If the movement distance (dist) is larger than the threshold L, the processing proceeds to step ST11. If it is determined in step ST10 that the movement distance (dist) is equal to or smaller than the threshold L, this operation is determined as a non-target operation, the processing does not proceed to the next step ST11, and control of continuing an ON state of the switch element 14 is not performed.

In step ST11, the "SW_LOCK_Flag" is set to "1".

In step ST12, it is determined whether or not the "SW_LOCK_Flag" is "1". Here, the processing passes through step ST11 and the "SW_LOCK_Flag" is "1". Thus, the processing proceeds to step ST13.

In other words, the case where it is determined as "Yes" in step ST12 corresponds to the case where an input operation is initially performed in a state where the input operation surface 11a is pressed downwardly within the non-specific region 31 with the finger F to cause the switch element 14 to be in an ON state, but the finger F approaches the hinge portion 20 and enters the specific region 30, rotation of the touch pad 11 is decreased, and the ON state of the switch element 14 is released.

In step ST13, the ON state of the switch element 14 is continued, and, for example, execution of the drag operation shown in FIG. 7 is kept. When the processing proceeds to step ST13, the control unit 21 emulates the ON signal S1 as being continuously obtained and continuously transmits the execution signal S3 to the apparatus body 22.

As described above, the control unit 21 of the embodiment is configured to be able to perform control so as to continue an ON state of the switch element 14 even when the ON state is released during an input operation.

Release of continuation control of an ON state of the switch element 14 will be described.

It is noted that as described above, "continuation control of an ON state" means that as long as an operation body such as the finger F touches or comes close to the input operation surface 11a and continues to perform an operation thereon, even when an ON state of the switch element 14 is released, the ON state is continued. Here, "release of continuation control of an ON state of the switch element 14" means a release process of an ON state in a state where the finger F touches or comes close to the input operation surface 11a and it is possible to proceed to steps ST12 and ST13 shown in FIG. 6A.

In the embodiment, a condition for releasing the continuation control of an ON state of the switch element 14 can be, for example, a timer process which is activated when a certain time has elapsed, a time when data indicating that the operation body such as the finger F does not touch or come close to the input operation surface 11a is obtained a certain number of times or more, or a time when an elapse time count value from a state where the operation body such as the finger F does not touch or come close to the input operation surface 11a becomes equal to or greater than a certain value in the case where a polling process which is activated in certain cycles is used.

It is noted that when the finger F is separated from the input operation surface 11a, the processing proceeds to step ST2 and the flow ends in the flowchart in FIG. 6A. In other words, when the finger F is separated from the touch pad 11, no execution signal is transmitted from the control unit 21 to the apparatus body 22, the state returns to the initial state (non-input state), and the input operation on the display screen automatically ends. It is noted that it is possible to perform control so as to continue the ON state of the switch element 14 even when the finger F is separated from the touch pad 11, but in this case, it is configured to be able to release the ON state by a predetermined operation such as a tap operation.

Figure 6B:
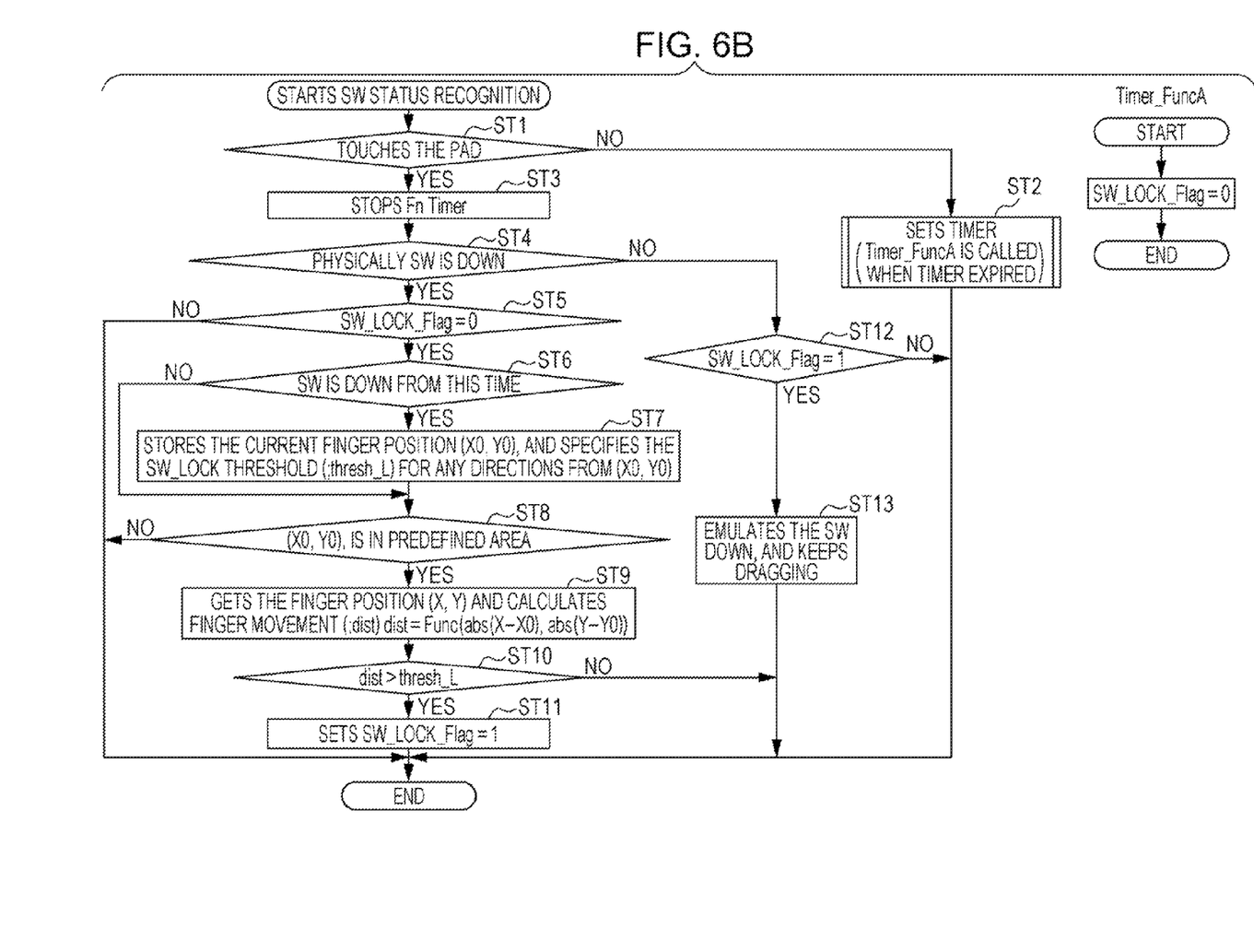
FIG. 6B is a flowchart regarding continuation control of an ON state of a switch element in another embodiment.

Alternatively, the order of steps may be changed as shown in a flowchart in FIG. 6B. In FIG. 6B, the processing can proceed to steps ST8 to ST11 after step ST7.

In FIG. 6B, subsequent to step ST7, it is determined whether or not an operation start position is within the specific region 30. In other words, in FIG. 6B, it is assumed that the operation start coordinate (X0,Y0) for obtaining the threshold L is within the specific region 30 (see an operation start position f in FIG. 5).

In addition, in FIG. 6B, if it is determined in step ST4 that the switch element 14 is in an OFF state, not in an ON state, the processing proceeds to step ST12. It is noted that a condition for proceeding to step ST12 assumes that it is in a state where the finger F touches or comes close to the touch pad 11 and operation position information can be obtained in step ST1. In FIG. 6B, since the "SW_LOCK_Flag" is "1" if the processing passes through step ST11, the processing proceeds to step ST13 and the ON state is controlled so as to continue.

It is noted that in FIG. 6B, step ST7 and step ST8 can be interchanged. In other words, it is also possible to set the threshold L after it is determined whether or not the operation start coordinate (X0,Y0) is within the specific region 30.

It is noted that the flowcharts shown in FIGS. 6A and 6B each illustrate merely one embodiment, and the actual operation is not limited to these flows. For example, the threshold L may not be set, and it is possible to continue an ON state of the switch element even with any movement distance. In this case, the steps related to the threshold L shown in FIGS. 6A and 6B are not executed (steps ST7, ST9, and ST10). In addition, the specific region may not be set. In this case, step ST8 is changed to a step for merely obtaining the operation start coordinate (X0,Y0). Furthermore, both the threshold L and the specific region may not be set. In this case, steps ST7 to ST10 are not executed.

Figure 8:
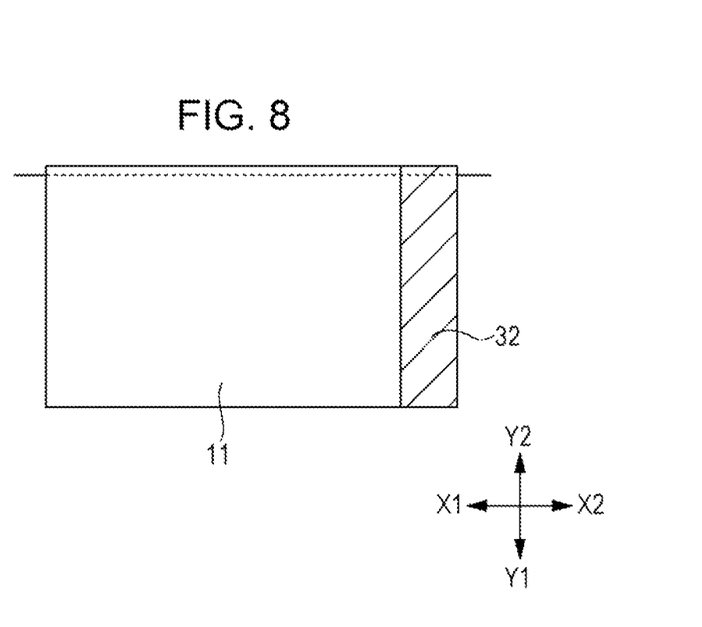
FIG. 8 is a plan view of an input operation surface showing a specific region different from that in FIG. 5.

In an embodiment shown in FIG. 8, a specific region 32 is provided on the right side (X2) of the touch pad 11. For example, the specific region 32 is a region where it is possible to perform a scroll operation. Even when an ON state of the switch element 14 is released during an input operation, if the finger F touches or comes close to the touch pad 11 within the specific region 32 and operation position information can be obtained, the control unit 21 can continue the ON state of the switch element 14 and transmit to the apparatus body 22 an execution signal which allows a scroll operation to be continuously performed.

It is noted that a plurality of specific regions may be set within the input operation surface 11a.

What is claimed is:

1. An input device comprising:
   a movable touch pad rotatably supported and having an upper surface as an input operation surface, the movable touch pad rotating about a hinge portion;
   a switch element located on a lower side of the touch pad; and
   a control unit configured to perform a continued-ON state control during an operation of an operation body moving on the input operation surface and pressing the input operation surface downwardly to cause the switch element to be in an ON state, the continued-ON state control maintaining the ON state even if the ON state of the switch element is released while the operation of the operation body continues on or in a vicinity of the input operation surface,
   wherein the control unit maintains the continued-ON state control under a condition that a movement distance of the operation body on the input operation surface is greater than a threshold L, the threshold L being changeable according to a moving direction of the operation body with respect to the hinge portion such that a first threshold is set for the moving direction directly approaching the hinge portion, a second threshold is set for the moving direction obliquely approaching the hinge portion, and a third threshold is set for the moving direction substantially parallel to the hinge portion, the first threshold being smaller than the second threshold which is smaller than the third threshold.

2. The input device according to claim 1, wherein the control unit maintains the continued-ON state control under a condition that an operation coordinate (X,Y) of the operation body is within a specific region defined on the input operation surface.

3. The input device according to claim 1, wherein the control unit maintains the continued-ON state control under a condition that the ON state of the switch element is released when the operation body is located within a specific region defined on the input operation surface, and an operation start position of the operation body is located in a non-specific region outside the specific region.

4. The input device according to claim 2, wherein the specific region is set in a vicinity of a hinge portion rotatably supporting the touch pad.

5. The input device according to claim 1, wherein the control unit releases the continued-ON state control based on a predetermined condition.

6. The input device according to claim 5, wherein the predetermined condition includes at least one of:
   a continuation time of the ON state;
   a number of times of data indicating that the operation body does not touch or come close to the input operation surface; and
   a number of times of polling.

7. The input device according to claim 1, wherein a drag operation is continued on a display body displayed on a display apparatus by the continued-ON state control maintained by the control unit.

8. The input device according to claim 1, wherein the hinge portion is provided along a first end portion of the movable touch pad, while the switch element is provided in a vicinity of a second end portion of the movable touch pad opposite to the first end portion.

* * * * *